United States Patent [19]

Presswood et al.

[11] Patent Number: 4,879,182
[45] Date of Patent: Nov. 7, 1989

[54] METHOD OF COATING CARBON BODIES

[75] Inventors: J. Kenneth Presswood; Alethea H. O'Quinn, both of Baton Rouge, La.

[73] Assignee: Ethyl Corporation, Richmond, Va.

[21] Appl. No.: 261,614

[22] Filed: Oct. 24, 1988

[51] Int. Cl.$^4$ .................. B32B 27/00; B32B 27/06; B32B 9/00

[52] U.S. Cl. .................. 428/408; 428/473.5; 528/185; 427/113; 427/385.5; 427/421

[58] Field of Search ............ 428/473.5, 408; 528/185; 427/113, 385.5, 421, 442.2

[56] References Cited

U.S. PATENT DOCUMENTS

| | | | |
|---|---|---|---|
| Re. 30,213 | 2/1980 | Gagliani et al. | 521/185 |
| Re. 32,255 | 9/1986 | Gagliani et al. | 521/56 |
| Re. 32,256 | 9/1986 | Gagliani et al. | 521/180 |
| 3,506,583 | 4/1970 | Boram et al. | 252/188 |
| 3,700,649 | 10/1972 | Boram et al. | 260/65 |
| 3,726,831 | 4/1973 | Acle et al. | 260/47 |
| 3,726,834 | 4/1973 | Acle | 260/65 |
| 3,793,281 | 2/1974 | Acle | 260/2.5 |
| 4,070,312 | 1/1978 | Gagliani et al. | 260/2.5 |
| 4,153,783 | 5/1979 | Gagliani et al. | 528/337 |
| 4,241,114 | 12/1980 | Gagliani | 427/370 |
| 4,241,193 | 12/1980 | Gagliani | 521/77 |
| 4,255,466 | 3/1981 | Natsume et al. | 427/113 |
| 4,255,488 | 3/1981 | Gagliani | 428/398 |
| 4,273,886 | 6/1981 | Gagliani | 521/185 |
| 4,296,208 | 10/1981 | Gagliani | 521/77 |
| 4,299,787 | 11/1981 | Gagliani | 264/41 |
| 4,305,796 | 12/1981 | Gagliani et al. | 204/159 |
| 4,315,076 | 2/1982 | Gagliani et al. | 521/77 |
| 4,315,077 | 2/1982 | Gagliani et al. | 521/77 |
| 4,315,080 | 2/1982 | Gagliani et al. | 521/189 |
| 4,319,000 | 3/1982 | Gagliani et al. | 521/189 |
| 4,332,656 | 6/1982 | Gagliani et al. | 204/159 |
| 4,346,182 | 8/1982 | Gagliani et al. | 521/189 |
| 4,353,998 | 10/1982 | Gagliani et al. | 523/219 |
| 4,355,120 | 10/1982 | Gagliani et al. | 521/189 |
| 4,360,604 | 11/1982 | Gagliani et al. | 521/189 |
| 4,361,453 | 11/1982 | Gagliani et al. | 156/79 |
| 4,363,690 | 12/1982 | Gagliani et al. | 156/307 |
| 4,363,883 | 12/1982 | Gagliani et al. | 521/122 |
| 4,367,296 | 1/1983 | Gagliani et al. | 521/189 |
| 4,369,261 | 1/1983 | Gagliani et al. | 521/189 |
| 4,407,980 | 10/1983 | Gagliani et al. | 521/99 |
| 4,425,441 | 1/1984 | Gagliani et al. | 521/56 |
| 4,426,463 | 1/1984 | Gagliani et al. | 521/180 |
| 4,433,068 | 2/1984 | Long et al. | 521/54 |
| 4,439,381 | 3/1984 | Gagliani et al. | 264/26 |
| 4,442,283 | 4/1984 | Gagliani et al. | 528/323 |
| 4,444,823 | 4/1984 | Gagliani et al. | 428/113 |
| 4,468,431 | 8/1984 | Okey | 428/317 |
| 4,476,254 | 10/1984 | Long et al. | 521/180 |
| 4,506,038 | 3/1985 | Gagliani et al. | 521/103 |
| 4,518,717 | 5/1985 | Long et al. | 521/109 |
| 4,535,099 | 8/1985 | Lee et al. | 521/154 |
| 4,535,101 | 8/1985 | Lee et al. | 521/189 |
| 4,539,336 | 9/1985 | Long et al. | 521/77 |
| 4,539,342 | 9/1985 | Lee et al. | 521/189 |
| 4,546,115 | 10/1985 | Gagliani et al. | 521/77 |
| 4,556,682 | 12/1985 | Gagliani et al. | 521/185 |
| 4,562,112 | 12/1985 | Lee et al. | 428/318 |
| 4,576,857 | 3/1986 | Gannett et al. | 428/406 |
| 4,576,862 | 3/1986 | Lee et al. | 428/317 |
| 4,585,805 | 4/1986 | Gagliani et al. | 521/129 |
| 4,599,365 | 7/1986 | Gagliani et al. | 521/56 |
| 4,600,770 | 7/1986 | Gagliani et al. | 528/322 |
| 4,604,440 | 8/1986 | Gagliani et al. | 521/157 |
| 4,621,015 | 11/1986 | Long et al. | 428/317 |
| 4,639,343 | 1/1987 | Long et al. | 264/45 |
| 4,647,597 | 3/1987 | Shulman et al. | 521/185 |
| 4,656,198 | 4/1987 | Shulman et al. | 521/56 |
| 4,708,972 | 11/1987 | Long et al. | 521/185 |
| 4,795,798 | 1/1989 | Tamai et al. | 528/185 |

Primary Examiner—George F. Lesmes
Assistant Examiner—D. R. Zirker
Attorney, Agent, or Firm—P. M. Pippenger; R. J. Hammond; J. F. Sieberth

[57] ABSTRACT

Described is a way of sealing a carbon body such as monolithic graphite tooling so that it retains its vacuum integrity through numerous thermal cycles typical of thermoplastic processing. This is accomplished by (a) applying to the body surface a coating formulation composed of a carbon-filled solution of a polyamic acid formed by reaction between pyromellitic acid dianhydride and 2,2-bis[4-(aminophenoxy)phenyl]hexafluoropropane, and (b) heat curing the coated body to cause the polyamic acid to imidize into a thermally cured polyimide.

15 Claims, No Drawings

METHOD OF COATING CARBON BODIES

TECHNICAL FIELD

This invention relates to coating carbon bodies, and more particularly to forming coatings with high vacuum integrity on graphite bodies such as monolithic graphite tooling.

BACKGROUND

A major advantage of monolithic graphite tooling, such as tooling for use in the manufacture of composite materials and the like, is its low CTE (coefficient of thermal expansion). Its porosity, however, is a drawback because it prevents attaining full vacuum in the composite bagging.

THE INVENTION

A method of overcoming the above problem has been found. In particular, this invention involves, inter alia, the discovery of a way of sealing such carbon surfaces by forming a coating thereon which retains its vacuum integrity through numerous thermal cycles typical of thermoplastic processing. Moreover these coatings may exhibit a CTE that more closely approximates that of the underlying carbon body itself than a number of other coating materials.

The method of this invention comprises (a) applying to a carbon body, such as monolithic graphite tooling, a coating formulation composed of a carbon-filled solution of a polyamic acid formed by reaction between pyromellitic acid dianhydride and a 2,2-bis[4-(aminophenoxy)phenyl]hexafluoropropane, and (b) heat curing the coated body to cause the polyamic acid to imidize into a thermally cured polyimide. While the idea of forming carbon-filled polyamic acid solutions was known heretofore, so far as is known the concept of using a carbon-filled solution as a coating for a carbon substrate in order to achieve a coating of high vacuum integrity was not previously known.

Most preferably the coating formulation is applied by spray coating or equivalent direct methods of application.

Curing is effected by heating the coated carbon substrate to a temperature in the range of about 160° to about 360° C. for a time sufficient to cause imidization of the polyamic acid. With graphite substrates and graphite-filled polyamic acid solutions it is preferred to use staged cure, increasing temperatures to effect the cure, such as for example heating the substrate at 240° C. for two hours and then at 355°–360° C. for two hours.

The coating solution should contain from about 15 to 30 PVC (pigment volume concentration, based on total solids) finely divided carbon (most preferably graphite powder), and should contain an amount of the polyamic acid equivalent to a solids content of from about 5 to about 8% by weight, depending on spray equipment requirements. If other methods of application are used such as brush coating, other concentrations of the polyamic acid may be employed. When applying the filled solution to the carbon substrate, care should be taken to insure that the carbon filler is well dispersed in the polyamic acid solution.

Generally speaking, the size of the carbon or graphite powder used in the formulation will depend to some extent upon the size of the pores in the carbon substrates to be coated. Thus if no basecoat is used, the average particle size should not exceed and preferably should be less than the average pore size of the substrate. The powder should of course be small enough to be dispersible in the coating formulation, with stirring or shaking where necessary. In most cases the average particle size will thus be less than about 25 microns. Powders having an averaage particle size falling in the range of about 1 to 10 microns are generally preferred for use in the formulations. Graphite powders of 2.5 and 10 micron average particle size have both been found highly satisfactory.

The solvent used in these carbon-filled polyamic acid solutions is not particularly critical, but preferably the solvent is composed of a dipolar aprotic solvent such as N,N-dimethylformamide, N,N-diethylformamide, N,N-dimethylacetamide, N,N-diethylacetamide, dimethyl sulfoxide, sulfolane, N-methylpyrrolidone, or the like, or a mixture of such dipolar aprotic solvents with each other, or a mixture of one or more such dipolar aprotic solvents with one or more volatile co-solvents (hydrocarbons, ketones, ethers, etc.).

Ordinarily the polyamic acid will be prepared by reacting approximately equimolar proportions of (i) pyromellitic acid dianhydride and (ii) 2,2-bis[4-(4'-aminophenoxy)phenyl]hexafluoropropane or 2,2-bis[4-(3'-aminophenoxy)phenyl]hexafluoropropane, or both, in a dipolar aprotic solvent of the type described above. Reaction temperatures of up to about 120° C. may be used.

No special surface preparation is required before applying the carbon-filled polyamic acid solution to the carbon substrate. Thus while a basecoat of unfilled or carbon-filled polyamic acid may be applied, experiments have indicated that even better results can be achieved by applying the above carbon-filled solution directly to a clean, machine, but otherwise untreated graphite surface.

In another of its forms, this invention provides a normally vacuum porous carbon body having a coating which is formed by (a) applying to a surface of the body a coating formulation composed of a carbon-filled solution of a polyamic acid formed by reaction between (a) pyromellitic acid dianhydride and a 2,2-bis-[4-(aminophenoxy)phenyl]hexafluoropropane, and (b) heat curing the coated body to cause the polyamic acid to imidize into a thermally cured polyimide and thereby rendering the coated portion of the carbon body capable of holding a vacuum. Most preferably, the monolithic carbon body is monolithic graphite tooling and the carbon of the carbon-filled solution is graphite powder.

The practice of this invention is illustrated by the following non-limiting example of its practice.

EXAMPLE

One-half inch thick graphite plates were coated on one face with a formulation composed of 30 PVC graphite powder suspended in a 5% solids solution of polyamic acid made from equimolar amounts of (i) pyromellitic acid dianhydride and (ii) 2,2-bis[4-(4'-aminophenoxy)phenyl]hexafluoropropane in N-methyl pyrrolidone, and diluted with methylethylketone such that the final solution contains about 76% (wt) methylethylketone and about 19% (wt) N-methylpyrrolidone. For convenience, this formulation is referred to below as the L-30N formulation. Three plates were coated pursuant to this invention with the L-30N formulation as follows:

Plate No. 1—No basecoat was used. The L-30N formulation was applied directly to the plate by spray coating and cured at 240° C. for 2 hours, then at 357° C. for 2 hours.

Plate No. 2—A basecoat of polyimide was formed by spray coating the face with an unfilled polyamic acid solution made from equimolar amounts of (i) benzophenone tetracarboxylic acid dianhydride and (ii) 2,2-bis[4-(4'-aminophenoxy)phenyl]hexafluoropropane in N-methyl pyrrolidone (solids content: 5% by weight) and curing the basecoat at 240° C. for one hour. The L-30N formulation was then applied over this basecoat and cured in the same manner as Plate No. 1.

Plate No. 3—A basecoat of polyimide was formed by spray coating the face with a 30 PVC graphite-filled polyamic acid solution made from equimolar amounts of (i) benzophenone tetracarboxylic acid dianhydride and (ii) 2,2-bis[4-(4'-aminophenoxy)phenyl]hexaafluoropropane in N-methyl pyrrolidone (polyamic acid solids content: 5% by weight) and curing the basecoat at 240° C. for one hour. The L-30N formulation was then applied over this basecoat and cured in the same manner as Plate No. 1.

The vacuum integrity of the cured coatings was measured with an apparatus comprising a glass funnel, a vacuum pressure gauge, tubing and a vacuum pump. A commercial adhesive used for bagging was applied around the rim of the funnel to create a seal between the funnel and the coated face of the graphite plate. Vacuum leak rates were measured over five minute intervals.

Thermal cycling began with 8-hour, 600° F. heat soaks. After four such cycles the soaks were extended to 16 hours. The samples were subjected to a total of 11 cycles and 144 hours at 600° F. The heat soak temperature was raised to 650° F. for the next 6 cycles (96 hours total). The above three plates retained vacuum integrity throughout the 650° F. cycling. The temperature for the heat cycles was then raised to 700° F. Slight leak rates were detected after four cycles, and the coating on Plate No. 2 had begun to crack. Testing continued through 10 cycles (160 hours total) at 700° F. At this point the leak rates for Plate Nos. 1 and 3 were about 4 inches of Hg per 5 minutes per 5 square inches. Plate No. 1 performed the best of all.

The foregoing disclosure has been presented for purposes of illustration and not limitation. As can readily be appreciated by those skilled in the art, this invention is susceptible to considerable variation in its practice within the spirit and scope of the ensuing claims.

What is claimed is:

1. A method sealing monolithic carbon bodies which comprises
    (a) applying to a vacuum-porous carbon body a coating formulation composed of a carbon-filled solution of a polyamic acid formed by reaction between pyromellitic acid dianhydride and a 2,2-bis[4-(aminophenoxy)phenyl]hexafluoropropane, and
    (b) heat curing the coated body to cause the polyamic acid to imidize into a thermally cured polyimide and thereby rendering the coated portion of the carbon body capable of holding a vacuum.

2. A method of claim 1 wherein the monolithic carbon body is monolithic graphite tooling and the carbon of the carbon-filled solution is graphite powder.

3. A method of claim 1 wherein the 2,2-bis[4-(aminophenoxy)phenyl]hexafluoropropane is 2,2-bis[4-(4'-aminophenoxy)henyl]hexafluoropropane.

4. A method of claim 1 wherein the coating formulation is applied to a monolithic carbon body devoid of a basecoat thereunder.

5. A method of claim 1 wherein the coating formulation is applied to a monolithic carbon body havingg a basecoat thereunder comprising a polyimide of benzophenone tetracarboxylic acid dianhydride and 2,2-bis[4-(4'-aminophenoxy)phenyl]hexafluoropropane formed thereon.

6. A method of claim 5 wherein the basecoat is carbon-filled.

7. A method of claim 1 wherein the monolithic carbon body is monolithic graphite tooling and the carbon of the carbon-filled solution is graphite powder; and wherein the 2,2-bis[4-(aminophenoxy)phenyl]hexafluoropropane is 2,2-bis[4-(4'-aminophenoxy)phenyl]hexafluoropropane.

8. A method of claim 7 wherein the coating formulation is applied to the monolithic graphite body devoid of a basecoat thereunder.

9. A method sealing monolithic carbon bodies which comprises
    (a) spraying onto a vacuum-porous carbon body a coating formulation composed of from about 15 to 30 PVC finely divided carbon dispersed in a solution containing from about 5 to about 8% by weight solids content of a polyamic acid formed by reaction between pyromellitic acid dianhydride and a 2,2-bis[4-(aminophenoxy)phenyl]hexafluoropropane, and
    (b) heat curing the coated body to cause the polyamic acid to imidize into a thermally cured polyimide and thereby rendering the coated portion of the carbon body capable of holding a vacuum.

10. A method of claim 9 wherein the monolithic carbon body is monolithic graphite tooling and the carbon of the carbon-filled solution is graphite powder; and wherein the 2,2-bis[4-(aminophenoxy)phenyl]hexafluoropropane is 2,2-bis[4-(4'-aminophenoxy)phenyl]hexafluoropropane.

11. A method of claim 9 wherein the coating formulation is applied to the monolithic graphite body devoid of a basecoat thereunder.

12. A method of claim 9 wherein the monolithic carbon body is monolithic graphite tooling and the carbon of the carbon-filled solution is graphite powder; wherein the 2,2-bis[4-(aminophenoxy)phenyl]hexafluoropropane is 2,2-bis[4-(4'-aminophenoxy)phenyl]hexafluoropropane; wherein the solvent of the coating formulation comprises a dipolar aprotic solvent and a lower dialkyl ketone; wherein the coating formulation is applied to the monolithic graphite body devoid of a basecoat thereunder; and wherein the curing is conducted with staged increasing temperatures.

13. A normally vacuum porous carbon body having thereon a coating formed by (a) applying to a surface thereof a coating formulation composed of a carbon-filled solution of a polyamic acid formed by reaction between (a) pyromellitic acid dianhydride and a 2,2-bis-[4-(aminophenoxy)phenyl]hexafluoropropane, and (b) heat curing the coated body to cause the polyamic acid to imidize into a thermally cured polyimide and thereby rendering the coated portion of the carbon body capable of holding a vacuum.

14. An article of claim 13 wherein the monolithic carbon body is monolithic graphite tooling and the carbon of the carbon-filled solution is graphite powder.

15. An article of claim 14 wherein the coating on the monolithic graphite body is devoid of a basecoat thereunder.

* * * * *